United States Patent [19]

Matsuura

[11] Patent Number: 5,832,327
[45] Date of Patent: Nov. 3, 1998

[54] PHOTOGRAPHIC FILM CASSETTE

[75] Inventor: Osamu Matsuura, Kanagawa, Japan

[73] Assignee: Fuji Photo Film Co., Ltd., Kanagawa, Japan

[21] Appl. No.: 966,793

[22] Filed: Nov. 10, 1997

[30] Foreign Application Priority Data

Nov. 11, 1996  [JP]  Japan .................................... 8-298846

[51] Int. Cl.$^6$ .................................................. G03B 17/26
[52] U.S. Cl. ........................ 396/512; 242/348; 242/348.4; 206/407
[58] Field of Search .................................... 396/512, 513; 242/348, 348.4, 588.5, 610, 610.4; 206/389, 407, 409

[56] References Cited

U.S. PATENT DOCUMENTS

| 4,024,557 | 5/1977 | Aoyama et al. | 354/275 |
|---|---|---|---|
| 5,106,665 | 4/1992 | Akao et al. | 206/407 |
| 5,369,457 | 11/1994 | Tamotsu | 396/512 |

OTHER PUBLICATIONS

Patent Abstracts of Japan, vol. 095, No. 001, Feb. 28, 1995 & JP 06 301158 A(Fuji Photo Film Co., Ltd.) Oct. 28, 1994 *Abstract.

Patent Abstracts of Japan vol. 009, No. 138 (C–286) Jun. 13, 1985 & JP 60 026063 A (Fuji Shashin Film KK; Dainippon Ink & Chem Inc;) Feb. 8, 1985 *Abstract.

Database WPI; Section Ch, Week 9306, Derwent Publications Ltd., London, GB; Class A89, AN 93–048785 XP002058165 & JP 04 372 945 A (Konica Corp) Oct. 25, 1992 *Abstract.

Primary Examiner—A. A. Mathews
Attorney, Agent, or Firm—Sughrue, Mion, Zinn, Macpeak & Seas, PLLC

[57] ABSTRACT

A cassette shell of a photographic film cassette is made up of a first steel material. The first steel material comprises a steel plate. On one face of the steel plate, a black resin layer is formed. On the other face of the steel plate, a print layer and a transparent resin layer are formed. When the cassette shell is formed by using the first steel material, the side of the black resin layer becomes an inner face of the cassette shell and the side of the transparent resin layer becomes an outer face thereof. Moreover, a cap of the photographic film cassette is made up of a second steel material. The second steel material comprises the steel plate. On both sides of the steel plate, the black resin layers are respectively formed.

12 Claims, 4 Drawing Sheets

PHOTOGRAPHIC FILM CASSETTE

BACKGROUND OF THE INVENTION

1. Field of the Invention

The present invention relates to a photographic film cassette comprising a cassette body in which a spool for winding a photographic film is rotatably contained, and more particular to a material for forming the cassette body.

2. Description of the Related Art

At present, various photographic films are used. However, for general photographing, a 135-type photographic film cassette is widely used. In the 135-type photographic film cassette, a spool is rotatably provided in a cassette body made of steel material. Further, an end edge of a photographic film having a width of 35 mm is fixed to the spool and the photographic film is wound onto the spool.

As well known, such a 135-type photographic film cassette comprises a cylindrical cassette shell made of steel material and a pair of caps made of steel material. The caps are respectively fitted to both opening sides of the cassette shell. Inside the photographic film cassette, the 35 mm-width photographic film wound onto the spool made of plastic is rotatably contained. Moreover, on the cassette shell of the photographic film cassette, photographable number, film sensitivity, original design of each manufacturer and so forth are printed by paint.

However, the above mentioned conventional cassette shell and cap are formed by processing a sheet-like steel material on which the design and so on are printed by paint. Accordingly, when the printed steel material is cut into a predetermined size, paint splinters are generated. The paint splinter remains in the photographic film cassette as it is and sticks to the photographic film. Therefore, there arises a problem in that the paint splinter affects the photography.

Moreover, when the design and so forth are printed on the steel material by the paint, an organic solvent is used. The organic solvent remains in the print layer by a little and volatilizes in a case for containing the photographic film cassette. Accordingly, there arises a problem in that the organic solvent affects an emulsion face of the photographic film and causes the fog of the photographic film and change of the sensitivity, for example.

SUMMARY OF THE INVENTION

In view of the foregoing, it is a primary object of the present invention to provide a photographic film cassette in which a bad influence is not given to photographic property by preventing paint splinters from generating when a cassette shell and a cap constituting the photographic film cassette are formed.

It is a second object of the present invention to provide a photographic film cassette in which the bad influence is not given to the photographic property by preventing a solvent remaining on a print face from volatilizing.

In order to active the above and other objects, the photographic film cassette according to the present invention comprises a cylindrical cassette shell and a cap which are respectively made up of a steel material. The cap is fixed to each of two opening sides of the cassette shell.

In a preferred embodiment, the cassette shell is made up of a first steel material. The first steel material comprises a steel plate, a black resin layer, a print layer and a transparent resin layer. The black resin layer is formed on one face of the steel plate. The print layer and the transparent resin layer are formed on the other face of the steel plate. When the cassette shell is made with the first steel material, the black resin layer side of the first steel material becomes an inner face of the cylindrical cassette shell and the transparent resin layer side of the first steel material becomes an outer face thereof.

The cap is made up of a second steel material. The second steel material comprises a steel plate and a black resin layer. The black resin layer is formed on both faces of the steel plate.

According to the present invention, the resin layer is formed on the print layer so that paint splinters or the like of the print layer is prevented from generating when a cassette body constituted of the cassette shell and the cap is made up. Further, a solvent remaining on the print layer is prevented from volatilizing by the resin later. Therefore, the photographic film cassette in which bad influence is not given to the photographic property may be provided.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
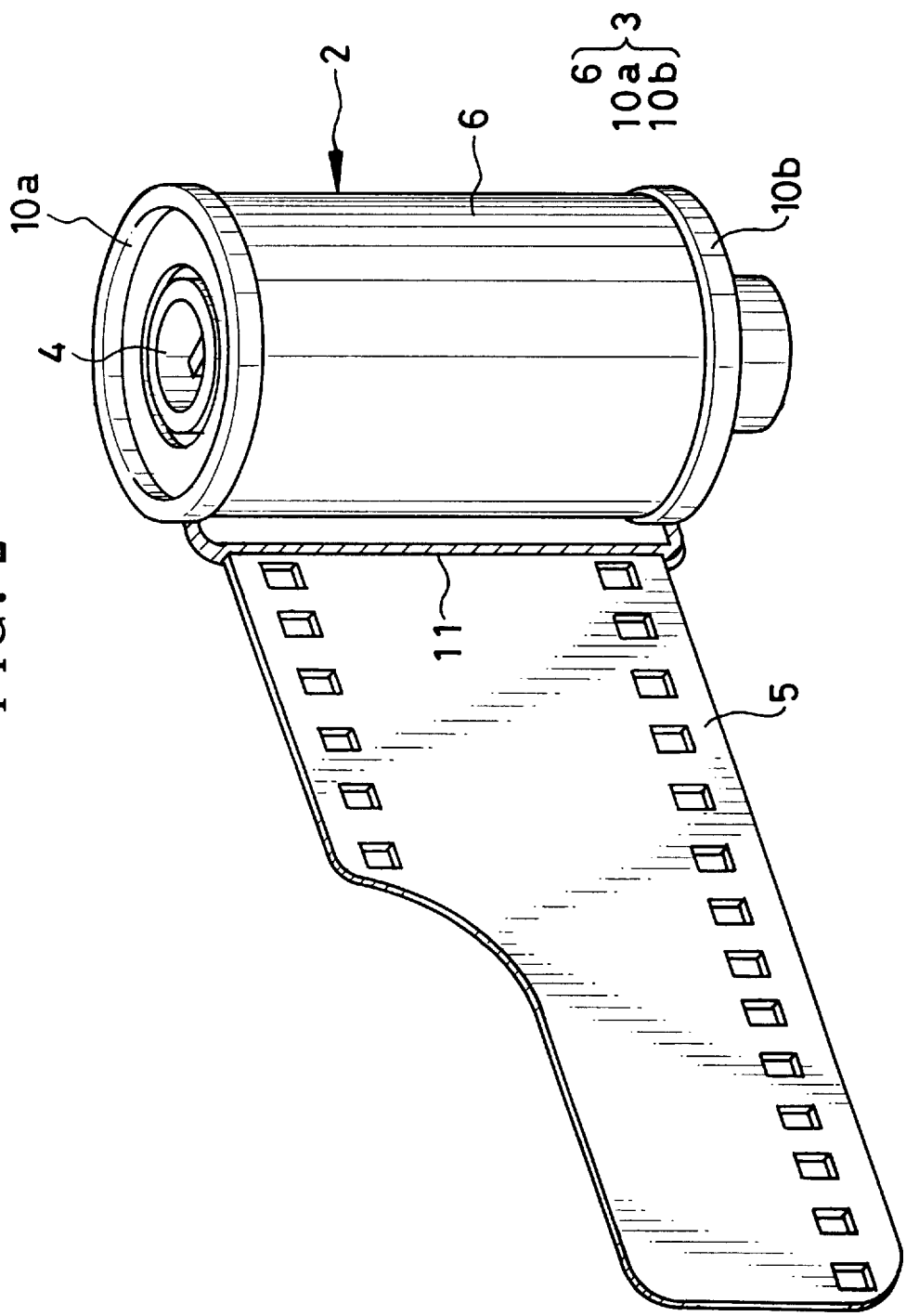
FIG. 2 is a perspective view of the photographic film cassette.
Figure 3:
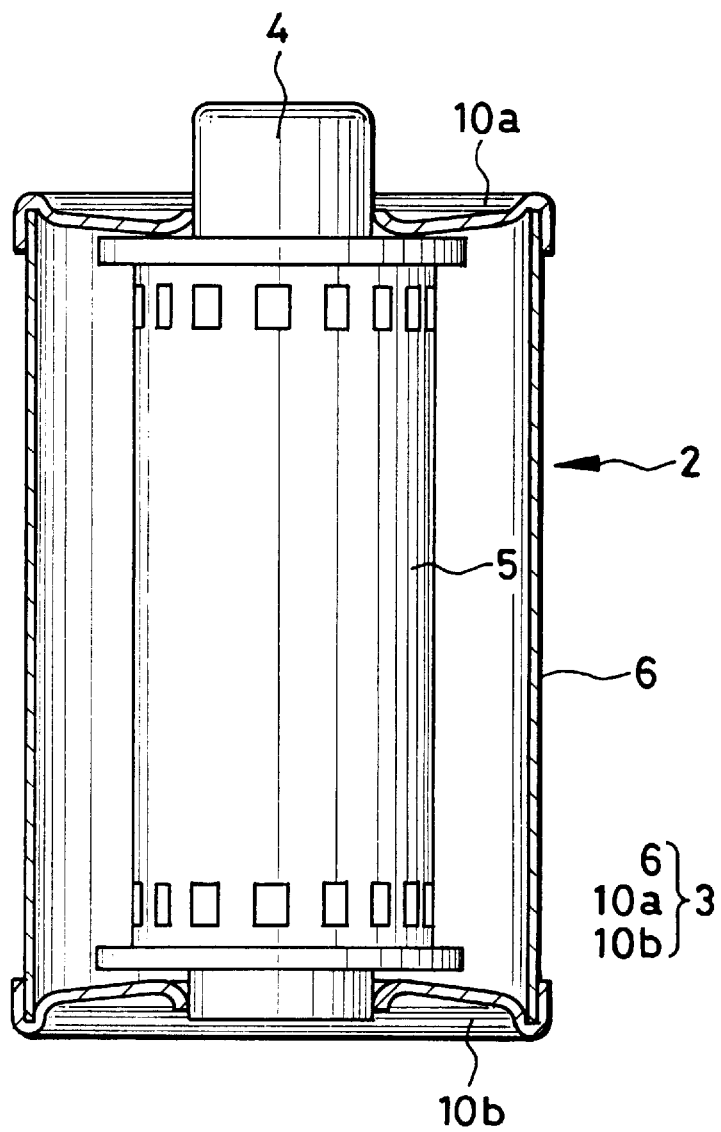
FIG. 3 is a sectional view of the photographic film cassette shown in FIG. 2.

FIG. 2 is a perspective view of a photographic film cassette according to the present invention and FIG. 3 is a sectional view thereof. The 135-type photographic film cassette 2 is constituted of a cassette body 3, a spool 4 and a photographic film 5 having a width of 35 mm. The cassette body 3 is constituted of a cylindrical cassette shell 6 and a pair of caps 10a and 10b for covering both opening faces of the cassette shell 6.

Both ends of the spool 4 are rotatably attached to the caps 10a and 10b and the photographic film 5 is wound onto the spool 4. The cassette shell 6 is provided with a film passage mouth 11 for getting the photographic film 5 in and out. The film passage mouth 11 is provided with a plush (not shown) for light-tightly shielding inside of the photographic film cassette 2.

Figure 1A:
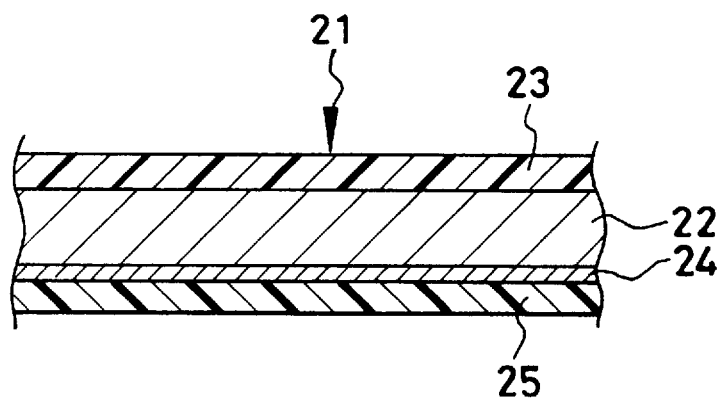
FIGS. 1A and 1B are sectional views showing layer structure of a steel material for forming a photographic film cassette according to the present invention.
Figure 1B:
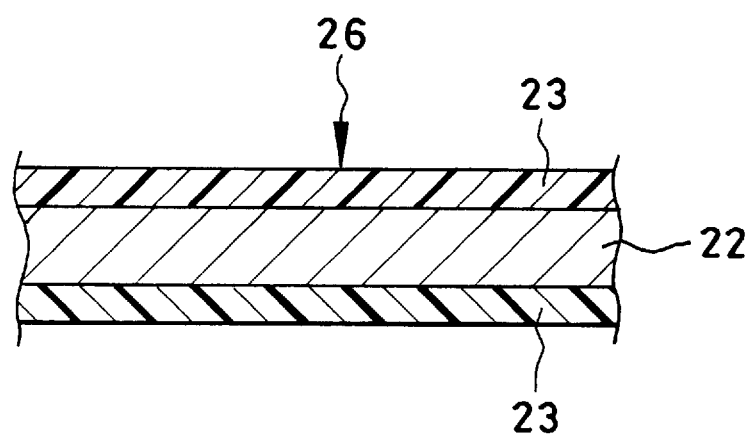

FIGS. 1A and 1B are sectional views respectively showing a layer structure of a steel material constituting the cassette shell of the photographic film cassette or the cap thereof. The steel material 21 constituting the cassette shell 6 is shown in FIG. 1A. A black resin layer 23 which is a sheet made of a black resin is formed on one face of a steel plate 22. A print layer 24 and a transparent resin layer 25 which is a sheet made of a transparent resin are formed on the other face of the steel plate 22. When the cassette shell 6 is formed by using such steel material 21, the side of the black resin layer 23 becomes an inner face of the cylindrical cassette shell 6 and the side of the transparent resin layer 25 becomes an outer face thereof. Moreover, a steel material 26 constituting the caps 10*a* and 10*b* is shown in FIG. 1B. The steel material 26 comprises black resin layers 23 formed on both faces of the steel plate 22.

The steel plate 22 is a cold-rolled steel plate or a hot-rolled hot-rolled steel plate. In other words, the steel plate is made by cold-rolled process or hot-rolled process. The thickness of the steel plate 22 is 0.25 mm, for example. After the steel plate 22 was rolled, surface treatment thereof is performed with high frequency and so forth in order to improve fusing force relative to the resin layer described in detail later.

As the resin constituting the black resin layer 23 and the transparent resin layer 25, a thermoplastic resin of uniaxial orientation or biaxial orientation, for example, is used. As the typical materials, there are polyester, nylon, polyethylene terephthalate, olefin, fluoroplastic, polyethylene naphthalate, polystyrene, polypropylene, polyethylene, polyvinyl chloride, polyvinylidene chloride, polyvinyl acetate, polymethacrylate, polyacrylonitrile, polycarbonate, polyamide and so forth. It is possible to use any resin having thermoplasticity. Especially, biaxially oriented polyester, biaxially oriented polyamide and biaxially polypropylene are preferable. The biaxially oriented polyester having a thickness of 7.5 $\mu$m to 15 $\mu$m is more preferable.

In order to weld the above resin to the steel plate 22, sometimes, preliminary adhesion is performed in advance. As the typical adhesive used for the preliminary adhesion, there are, for example, polyolefine thermoplastic resin hot-melt adhesive including various polyethylene resins, various polypropylene resins and so forth, thermoplastic resin hot-melt adhesive including ethylene propylene copolymer resin, ethylene vinylacetate copolymer resin, ethylene ethyl acrylate copolymer resin, ionomer resin and so forth, and hot-melt rubber adhesive.

The surface of the steel plate is heated by specialty process of metal material, for example, high-frequency heating process, magnetic induction heating process, microwave process to melt the resin directly and to adhere it to the steel plate.

In order to improve adhesion properties between the resin and the steel plate, anchor coating agent may be used. As the anchor coating agents, there are, for example, organic titanate anchor coating agent (Tetra-propyl-titanate, Ters-iso-butyl-titanate), polyethylene-imine anchor coating agent (polyethylene-imine $(CH_2—CH_2—NH)_n$ having high polymerization degree), isocyanate anchor coating agent (there are one-pack type in which polymer having isocyanate group is used alone and two-pack type in which polyester and so on having hydrpxyl group is combined. In both types, the adhesive effect is obtained by causing crosslinking reaction and so forth), polyester anchor coating agent, polyurethane anchor coating agent, polyolefin anchor coating agent, and polybutadiene anchor coating agent.

As to the black resin layer 23 constituting the steel materials 21 and 26, the resin is blacked in order to give a light shielding property to the resin layer. With respect to blacking method, an integral coloring type or a printing type is available. An ink used in the printing type is selected so as not to affect a photosensitive material of a photographic film. It is possible to select the ink from among an offset printing ink, a gravure printing ink and an ultraviolet ink which are generally used.

As typical resins used for the printing ink of the black resin layer 23, there are, for example, vinyl chloride vinyl acetate, pyroxylin, polyester, polyamide urethane, polyacryl, rosin modification maleic acid, ethylene-vinyl acetate, vinyl ether, urethane-vinyl acetate, vinyl chloride vinyl acetate urethane resin, modified alkyd resin modified phenolic resin, alkaline soluble resin (rosin modification maleic acid resin, styrene maleic acid resin, styrene acrylic resin, acryl ester acrylic resin, and methacrylate acrylic resin), hydro sol resin (styrene maleic acid resin, styrene acrylic resin, α-methylstyrene acrylic resin, acryl ester acrylic resin, and methacrylate acrylic resin), and emulsion resin (styrene resin, styrene acrylic ester resin, acryl ester copolymer resin, methacrylate copolymer resin).

As typical resins used for the ultraviolet ink of the black resin layer 23, polymer having acryl unsaturated group, for example, is generally used. As typical examples, there are polyester/acryl ester, polyester/urethane/acryl ester, epoxy resin/acryl ester, pentaerythritol acrylate, trimetylolpropane triacrylate, hexanediol dieacrylate, neopentyl glycol dieacrylate, triethylene glycol dieacrylate, and hydroxyethyl methacrylate.

For blacking the resin, carbon black is mainly used. As articles on the market, there are, for example, carbon black #5, #20, #33, #40, #44, #45, #52, #900, #1000, #2200B, #2400B, #2350, MA8, and MA100 which are respectively manufactured by Mitsubishi Chemical Co., Ltd.

When the thickness of the black resin layer 23 is properly set, influence of the adhesive used for adhesion with the steel plate may be reduced. For example, when the thickness of the black resin layer 23 is set more than 5 $\mu$m, there are no influence of the adhesive due to entrapment effect of the resin.

On the other hand, if the thickness of the black resin layer 23 is set more than 20 $\mu$m, the burr breaks out when the steel material 21 and 26 are cut. Further, if the thickness of the black resin layer 23 is more than 50 $\mu$m, the burr increases abruptly. In view of this, with respect to the thickness of the black resin layer 23, the range from 5 $\mu$m to 50 $\mu$m is preferable and the range from 5 $\mu$m to 15 $\mu$m is more preferable.

The transparent resin layer 25 constituting the steel material 21 is provided to improve the printing property, to prevent the rise of temperature under the sun light, and to improve an outward appearance of the photographic film cassette 2, for example. White pigment may be included in the above resins used for the black resin layer.

The white pigment in which white inorganic particle having an average particle diameter of 0.01–50 $\mu$m is included by 0.3–30 wt. % is preferable. If the average particle diameter of the white inorganic particle is less than 0.01 $\mu$m, dispersal becomes bad so that lamps tends to be generated by flocculation. Moreover, if the average particle diameter is more than 50 $\mu$m, dispersal property is improved. However, hiding power is lowered and physical strength of the resin layer is also lowered.

If admixture amount of the white inorganic particle is less than 0.3 wt. %, hiding power is lowered. Moreover, if the white inorganic particle is more than 30 wt. %, the physical strength of the resin layer is lowered. Further, the white inorganic particle is separated and dispersed by vibration and friction so that the photographic film 5 is soiled with that as a white powder.

As examples of the white inorganic particle, there are titanium oxide, clay, mica, aluminum oxide, calcium silicate, aluminum hydroxide, calcium carbonate, barium sulfate, and so forth. Besides that, titanium dioxide, silicon dioxide, magnesium oxide, and so forth which have white appearance in visible light range may be used. Incidentally, titanium dioxide is especially preferable among these white inorganic particles.

As typical synthetic resins used for the printing ink of the print layer 24 of the steel material 21, there are, for example, vinyl chloride vinyl acetate, pyroxylin, polyester, polyamide urethane, polyacryl, rosin modification maleic acid, ethylene-vinyl acetate, vinyl ether, urethane-vinyl acetate, vinyl chloride vinyl acetate urethane resin, modified alkyd resin, modified phenolic resin, alkaline soluble resin (rosin modification maleic acid resin, styrene maleic acid resin, styrene acrylic resin, acryl ester acrylic resin, and methacrylate acrylic resin), hydro sol resin (styrene maleic acid resin, styrene acrylic resin, α-methylstyrene acrylic resin, acryl ester acrylic resin, and methacrylate acrylic resin), and emulsion resin (styrene resin, styrene acrylic ester resin, acryl ester copolymer resin, methacrylate copolymer resin).

As resins used for the ultraviolet ink of the print layer 24, polymer having acryl unsaturated group, for example, is generally used. As typical examples, there are polyester/acryl ester, polyester/urethane/acryl ester, epoxy resin/acryl ester, pentaerythritol acrylate, trimetylolpropane triacrylate, hexanediol dieacrylate, neopentyl glycol dieacrylate, triethylene glycol dieacrylate, and hydroxyethyl methacrylate.

For the printing ink of the print layer 24 of the steel material 21, well-known various colorants are used. As typical organic colorants, there are pigments of various types disclosed in Japanese Patent Laid-Open Publication No. 63-44653, for example. Besides that, there are azo-pigment (azo-lake; carmine 6B, red 2B, insoluble azo; monoazo yellow (PY-1, -3), disazo yellow (PY-12, -13, -14, -17, -83), pyrazolone orange (PO-B-34), vulcan orange (PO-16), condensation azo; chromophthal yellow (PY-93, -95), chromophthal red (PR-144, -166), polycyclic pigment [phthalocyanine; copper phthalocyanine blue (PB-15, -15-1, -15-3), copper phthalocyanine green (PG-7), dioxazine; dioxazine violet (PV-23), isoindolinone; isoindolinone yellow (PY-109, -110), perylene-based; perylene, perinone, flavanthrone, thioindigo, lake pigment (malachite green, rhodamine B, rhodamine G, victoria blue B).

As inorganic colorants, there are, for example, oxide (titanium dioxide, red oxide), sulfate (precipitated barium sulfate), carbonate (precipitated calcium carbonate), silicate (water-containing silicate, water-free silicate), metallic flake (aluminum flake, bronze powder, zinc dust, carbon black, chrome yellow, Prussian blue). These colorants may be loaded with the black resin layer 23 as a light shielding material. Besides that, oil-soluble dye, disperse dye and so forth are usable. As raw materials constituting the ink, various solvents, dispersant, wetting agent, anti-foaming agent, leveling agent, thickening agent, stabilizer, crosslinker, and addition agent including wax and drier are used at need.

[Example]

In a first Example of the photographic film cassette according to the present invention, as the steel plate constituting the steel material, T.F.S. steel plate having a thickness of 0.25 mm was used. The surface treatment of the steel plate was performed with the high frequency in order to carry out the heat fusing of the resin layer easily. Polyethylene terephthalate resin layer being a sheet colored in black with the carbon black and having a thickness of 15 μm was formed on one face of the T.F.S. steel plate as the black resin layer. The print layer in which the design was printed was formed on the other face of the steel plate. Further, polyethylene terephthalate resin layer having a thickness of 20 μm, in which titanium white was kneaded, was formed on the print layer as the transparent resin layer. The cassette body of the photographic film cassette was formed by using such steel material.

As a consequence that the photographic film cassette was formed by using the above-described steel material, the resin layer became a barrier so that the residual solvent did not separate out. Moreover, off-cut due to peeling and so forth was not generated when the steel plate was cut, because the steel plate treated with the high frequency was used in order to improve the fusing characteristics.

In a second Example of the photographic film cassette according to the present invention, for the steel plate constituting the steel material, the cold-rolled material having a thickness of 0.25 mm was used. Further, nylon resin colored in black with the carbon black and having a thickness of 15 μm was formed on both faces of the cold-rolled material. The cap of the photographic film cassette was formed by using such cold-rolled material. With respect to the adhesive, the adhesive in which a volatile content is not contained was used. As a consequence that the photographic film cassette was made up of the above steel material, off-cut due to peeling and so forth was not generated when the steel plate was punched.

As the conclusion of the Examples, a test result of the photographic characteristic, the off-cut and the waste of punching relative to each thickness of the resin layer is shown in Table 1.

TABLE 1

| Thickness of Resin Layer | Photographic Characteristic | Offcut | Waste of Punching |
| --- | --- | --- | --- |
| 5 | Δ | ○ | Δ |
| 10 | ○ | ○ | ○ |
| 15 | ○ | ○ | ○ |
| 20 | ○ | ○ | ○ |
| 25 | ○ | ○ | Δ |
| 50 | ○ | Δ | Δ |
| 100 | ○ | Δ | Δ |
| 200 | ○ | X | X |
| 300 | ○ | X | X |

Unit of the thickness is μm.
Mark "○" represents a good result.
Mark "Δ" represents an ordinary result.
Mark "X" represents a bad result.

Figure 4:
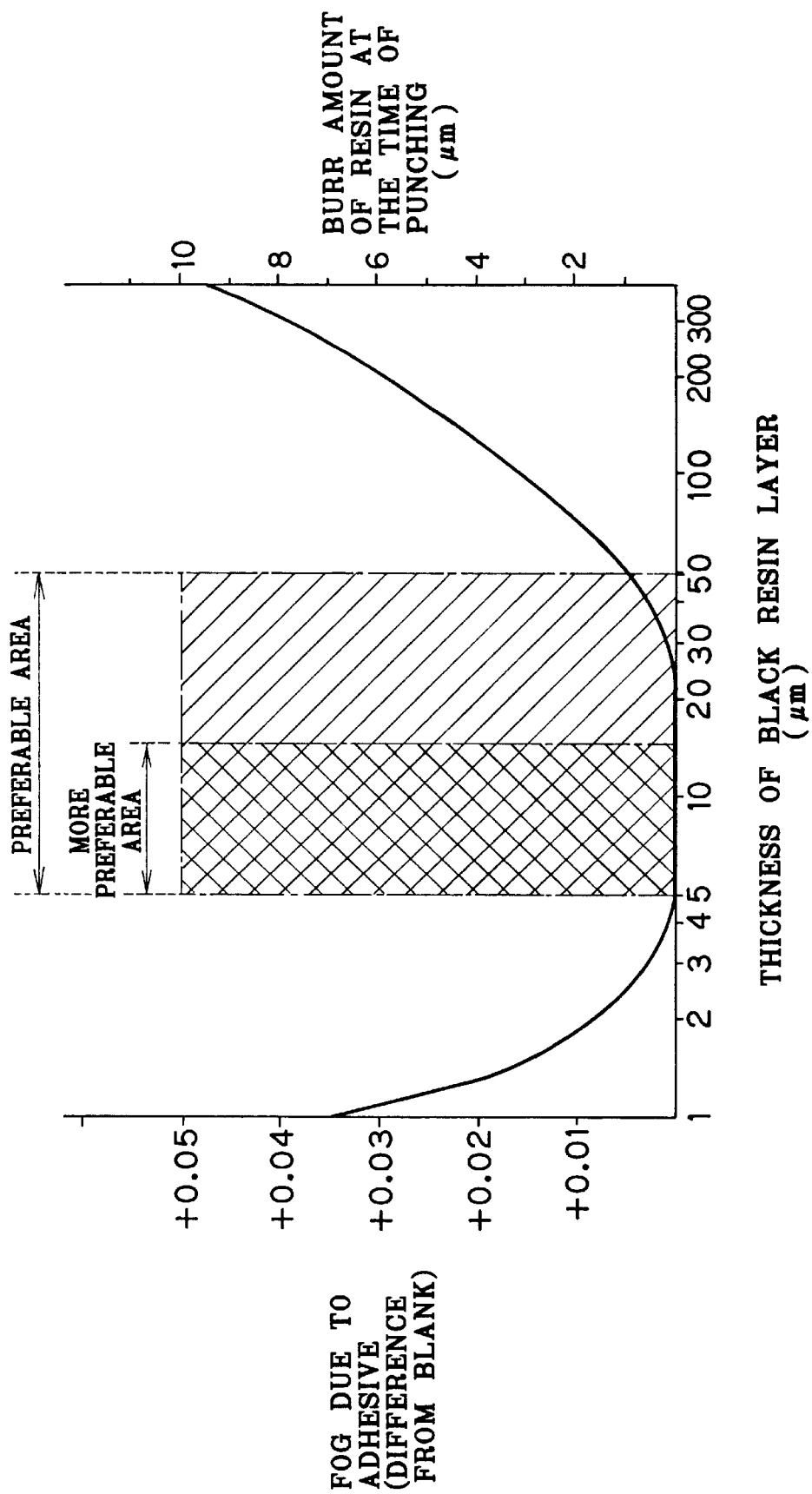
FIG. 4 is a graph showing relationships between a thickness of a black resin layer and fog due to adhesive, and between the thickness of the black resin layer and a burr amount of resin at a time of blanking.

FIG. 4 is a graph showing a relationship between the thickness of the black resin layer and the fog due to the adhesive. Further, FIG. 4 shows a relationship between the thickness of the black resin layer and the burr amount of resin at the time of punching as well. As stated above, when the thickness of the black resin layer is set more than 5 μm, there are no influence of the adhesive by entrapment effect of the resin. On the other hand, if the thickness of the black resin layer is set more than 20 μm, the burr breaks out when the steel material is punched. Further, if the thickness of the black resin layer is more than 50 μm, the burr amount increases abruptly. From the graph, it is understood that the fog and the burr amount of the resin may be reduced by setting the thickness of the black resin layer in a range of 5–50 μm. Furthermore, the fog and the burr amount become more preferable by setting the thickness of the black resin layer in a range of 5–15 μm.

As described above, in the photographic film cassette according to the present invention, the cassette body is made up of the steel material in which the sheet made of resin, or a plastic film welds or adheres to one face or both faces of the steel plate. Accordingly, the paint splinters or the like is prevented from generating when the cassette shell and the cap constituting the cassette body are formed. Further, the solvent remaining on the print face is prevented from volatilizing. Therefore, the photographic film cassette in which bad influence is not given to the photographic characteristic may be provided.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic film cassette in which a spool of photographic film is rotatably wound therein, said photographic film cassette having a cylindrical cassette shell and a pair of caps fitted to both ends of said cassette shell, material of said cassette shell comprising:

a first steel plate made by cold-rolled process or hot-rolled process; and a first resin layer formed at least on a first face of said first steel plate, said first resin layer consisting of a first plastic film attached to said first steel plate by welding or adhesion.

2. A photographic film cassette according to claim 1, wherein material of said first plastic film is any one of polyester resin, nylon resin, polyethylene terephthalate resin, olefin resin, fluoroplastic resin, polyethylene resin, polystyrene resin and polyethylene naphthalate resin.

3. A photographic film cassette according to claim 2, wherein a thickness of said first plastic film is 5–50 $\mu$m.

4. A photographic film cassette according to claim 3, wherein said thickness of said first plastic film is 5–15 $\mu$m.

5. A photographic film cassette according to claim 2, wherein said first plastic film includes carbon black in order to blacken its color.

6. A photographic film cassette according to claim 5, wherein a print layer is formed on a second face of said first steel plate on which said resin layer is not formed, further, said print layer is overlapped with a transparent resin layer.

7. A photographic film cassette according to claim 6, wherein said transparent resin layer includes a titanium white kneaded therein.

8. A photographic film cassette according to claim 1, wherein material of said cap comprising:

a second steel plate made by cold-rolled process or hot-rolled process; and a second resin layer formed on both faces of said second steel plate, said second resin layer consisting of a second plastic film attached to said second steel plate by welding or adhesion.

9. A photographic film cassette according to claim 8, wherein material of said second plastic film is any one of polyester resin, nylon resin, polyethylene terephthalate resin, olefin resin, fluoroplastic resin, polyethylene resin, polystyrene resin and polyethylene naphthalate resin.

10. A photographic film cassette according to claim 9, wherein a thickness of said second plastic film is 5–50 $\mu$m.

11. A photographic film cassette according to claim 10, wherein said thickness of said second plastic film is 5–15 $\mu$m.

12. A photographic film cassette according to claim 11, wherein said second plastic film includes carbon black in order to blacken its color.

* * * * *